Patented Oct. 27, 1953

2,657,163

UNITED STATES PATENT OFFICE 2,657,163

WALLBOARD ADHESIVE AND METHOD

Walter P. Ericks, Lockport, N. Y., assignor to The Upson Company, Lockport, N. Y., a corporation of New York No Drawing. Application March 6, 1951, Serial No. 214,215

13 Claims. (Cl. 154—141)

This invention relates to the method of preparation and composition of an adhesive for bonding cellulose fiber sheets together as well as the resulting laminated fiber board. More particularly, it refers to an adhesive composed of an acid modified starch containing one or more auxiliary agents which produce substantial improvement in its properties, the method of preparing said adhesive and its employment for bonding sheets of cellulose fibers together.

It is an object of the invention to provide an improved adhesive for binding cellulose sheets together, which adhesive is not only inexpensive but has increased initial tack and the characteristic of increasing the water-resistance of laminated fiber boards containing the adhesive as the bonding agent.

Another object of the invention is to provide a starch type adhesive in which aluminum sulfate is employed to modify the properties of acid converted starch in order to produce a higher initial tack.

Another object is to provide an improved process of producing a starch type adhesive particularly suitable for bonding together the laminations of laminated cellulose fiber boards so as to provide an increased initial tack and enable such boards to be laminated at an increased rate while at the same time producing a laminated board having increased water resistance.

Another object of the invention is to provide a process of producing an improved laminated cellulose fiber board in which an adhesive containing acid converted starch modified by the incorporation of aluminum sulfate is employed to bond sheets of cellulose fiber together.

A further object of the invention is to provide an improved laminated cellulose fiber board having increased water resistance in which board the laminations are bonded together with an acid converted starch modified by the incorporation of aluminum sulfate.

A still further object of the invention is to provide a laminated cellulose fiber board having increased water resistance and increased resistance to mold or other fungus growth.

Other objects and advantages of the invention will appear in the following detailed description of the invention.

Raw starch derived from corn, potatoes and other sources, possesses poor adhesiveness. In order to improve their adhesive characteristics, raw starches are usually subjected to one of the well known processes of conversion. The intermediate products of conversion are known to commerce as dextrins, British gums, thin boiling starches, alkaline starches, and enzyme converted starches, while the end product of starch conversion is dextrose.

Similarly to the raw starches, dextrose also possesses poor adhesiveness, while the intermediate products, the modified starches, exhibit superior adhesive properties. The adhesive characteristics of the three types of products mentioned above are correlated with the degree of their solubility in water. The raw starches are insoluble and dextrose is completely soluble in water. Both of these materials possess weak adhesive properties. The intermediate products of starch conversion obtained by action of acids, alkalies, heat and enzymes, lie near but not quite in the zone of true or crystalloidal solutions. They produce greater colloidality in water than raw starch or dextrose and exhibit greater power of adhesiveness.

The present invention contemplates the employment of acid converted, or acid modified starches because they lend themselves to the preparation of adhesives with high solids content at a workable viscosity. A high solids content in the adhesive is required in the lamination of cellulose fiber board in order to avoid the introduction of excessive moisture into the board. Such excess moisture causes abnormal dimensional changes and occasionally is accompanied by warping and delamination. Lack of the required high solids content at a suitable viscosity in an adhesive prepared from alkali and enzyme converted starches and other objectionable characteristics of such starches precludes their effective use in cellulose fiber board lamination.

Dextrins and thin boiling starches, both of which are acid converted starches, are particularly well suited for practicing my invention because the adhesive prepared therefrom not only more nearly complies with the requirements of high solids content at workable viscosity and good adhesiveness, but also because the acid converted starches do not contain any objectionable alkalies, which may interact with rosin size contained in the cellulose fiber sheets, and because they do not require carrying out starch conversion on each individual batch as usually practiced in the manufacture of adhesives prepared from enzyme converted starches.

The adhesives heretofore prepared from converted starches, including the acid converted starches, fail however in producing a quick initial tack and good water resistant bond. Much effort has been expended in modifying the acid converted starch adhesives in attempts to improve their properties.

For example, the improvement of initial tack has been attempted by the incorporation of resin emulsions, such as polyvinyl acetate emulsions into acid converted starch adhesives. The resin emulsions have been found to be unstable under conditions of their application. Apparently one or more of the conditions encountered during application, such as turbulence, heating, cooling and contact with metals, causes breaking of the resin emulsions with resulting skinning and lump formation.

Improvement of water resistance has been attempted in the past by incorporation of fast reacting thermosetting resins, such as urea formaldehyde and resorcinol formaldehyde. The tendency of these resins toward jelling shortens the useful life of the adhesive to such an extent that their application on a large scale is impracticable. Furthermore, these resins affect adversely the initial tack of the acid modified starch adhesives. Potassium pyroantimonate had been recommended as an insolubilizing agent for highly aggregated starches. It appears to be ineffective when used with acid converted starches. In any event, its employment requires heating the dry adhesive film at a temperature of 200° F. and higher. A cellulose fiber board during such heat treatment undergoes complete dehydration with accompanying injurious, excessive dimensional changes, and requires subsequently an additional expensive and time-consuming re-humidifying operation.

The thinning of thick starch pastes has been attempted in the past by the incorporation of urea, dicyandiamide, and various concentrated salt solutions. The presence of these materials in the dry film of the bond adversely affects its water resistance, and for this reason such materials are unsuitable for adhesives employed in cellulose fiber board lamination.

In accordance with the present invention, I have found that the initial tack and water-resistance of the bond can be substantially improved by incorporating into an acid modified starch adhesive a small quantity of aluminum sulfate and adjusting the pH of the resulting adhesive to a value within the range of 4.5 to 5.2. The improvements in initial tack and water-resistance obtained by the incorporation of aluminum sulfate are so profound that they suggest that the changes in properties result from a chemical reaction accompanied by alteration of the molecular structure of acid modified starches.

It is believed that the intermediate products of acid conversion of starch, namely, dextrins and thin boiling starches, are composed of less stable species of molecules than those present in the original and end products of starch conversion, and that the partially degenerated starches known as dextrins and thin boiling starches, possess free or labile valences which make them quite reactive. It is further believed that glucose residues of partially degenerated starches possess free or labile valences not possessed by either raw starch or dextrose which enable such residues to react quite readily with aluminum ions of aluminum hydroxide formed in the course of aluminum sulfate hydrolysis in water.

The optimum condition for the above reaction apparently occurs within the range of pH 4.5 and 5.2. Marked deviations from the pH range reflects unfavorably on the degree of improvement resulting from the incorporation of aluminum sulfate into acid converted starch adhesives. In view of the acidic character of aluminum sulfate when dissolved in water, the lowering of pH of nearly neutral acid converted starches takes place during the incorporation of aluminum sulfate ordinarly without the necessity of further adjusting the pH. It is quite remarkable that the improvement in initial tack and water-resistance of the bond obtained through the use of aluminum sulfate in acid modified starch adhesives takes place readily and without subjecting the laminated board to objectionable heat treatment. Concurrently with the improvement in initial tack and water-resistance, acid converted starch adhesives containing a small quantity of aluminum sulfate exhibit decreased viscosity and improved flow for a given solids content.

I have found that 0.1 to 0.3% of aluminum sulfate based on the weight of the acid converted starch is quite effective in producing improvements. This will usually also reduce the pH of the adhesive to a pH within 4.5 to 5.2 but if the pH is still above 5.2 the addition of further amounts of aluminum sulfate, in order to lower the pH to a value within the range given, has no deleterious effect, although other acidic materials such as mineral acids, for example, hydrochloric or sulfuric acid, may be employed instead of an excess amount of aluminum sulfate, or an equivalent means for reducing the pH, as long as an effective proportion of aluminum sulfate is present, as indicated above. An alkali may be added, if necessary, to raise the pH within the above range, as well understood in the art.

The effectiveness of aluminum sulfate is equally good whether it is added prior or subsequent to the cooking of the starch during the preparation of an adhesive from acid converted starch as described more fully below. The improvements obtained during the operation of the process of this invention on a large scale are quite apparent. Due to the improved initial tack the speed of the laminating machine could be increased by over 50% with resulting satisfactory bonding and improved water-resistance of the board.

The addition of aluminum sulfate to acid converted starch during the preparation of an adhesive from such starch should be distinguished from the employment of acidic salts to inactivate an amylolytic enzyme used to produce enzyme converted starch and from the addition of various salts to raw starch and heating to modify the properties of the starch. Enzyme converted starch, as stated above, is not suitable for employment in the present invention because of the low solids content of an aqueous dispersion thereof at a usable viscosity. Also the effect of adding acidic salts, in addition to stopping enzyme action, is stated to be an increase in viscosity instead of the decrease in viscosity obtained in the present invention when aluminum sulfate is added to acid modified starch. Furthermore, the employment of various salts including aluminum sulfate to modify or convert raw starch results in starch conversion products producing high viscosity, low solids content dispersions in water as compared to acid converted starch. In addition, such modified starches are much more difficult to disperse in water than is acid converted starch.

In this connection, the elimination of lump formation during mixing of even acid converted starch with water is a common problem in adhesive preparation on a large scale. Among the acid converted starches, the dextrins have a decided tendency toward forming lumps even when effective mechanical agitation is maintained. The water in this operation is usually kept at room temperature because the heating of the water during charging, and before the lumps are dispersed, aggravates the situation. Even in water at room temperature, the starch gelatinizes on the surface of lumps of starch and firmly envelopes the dry starch within the lumps. Such lumps cause blocking of screen near the delivery pump, and when allowed to flow to the laminating machine, cause damage to the board by improper and ineffective bonding.

In the course of my investigation of acid converted starch adhesives, I have found an improved method of overcoming the lump formation of starches during their introduction into water. I have found that lump formation can be prevented without affecting the water-resistance of the bond by dissolving a hydrolyzable dispersing agent in the water prior to charging the acid modified starch. Ordinary non-hydrolyzable agents are unsuitable for this process because their presence in the adhesive film adversely affects their water-resistance.

Among the dispersing agents I have found that dialkyl esters of sodium sulfo-succinate satisfactorily promote wetting of starch, and due to their properties of hydrolysis in hot water, they do not alter the water-resistance of the starch adhesive. That is to say, the wetting properties of the wetting agent are effective during the initial mixing of the starch with cold water but are diminished or eliminated during the cooking of the starch and are not regained. The di-2-ethyl hexyl sodium sulfo-succinate is preferred over other esters because of its high wetting power. It possesses the property of readily wetting the dextrins during their introduction into the water, and readily disperses the lumps which tend to form in this operation.

The properties of the adhesives prepared in the course of the investigation were evaluated according to the following methods. The viscosities of the adhesives were determined by Brookfield viscometer at 67° C. Evaluation of initial tack was conducted by applying 0.0015" thick film of adhesive by means of a Bird applicator to a strip of cellulose fiber sheet having dimensions of 0.6"x2"x8", covering this strip with another strip of the same kind and dimensions, running the assembled strips between rolls under 50 lb. nip pressure, allowing the laminated strips to remain for 30 seconds, tearing them apart on the glue line and examining the degree of damage produced on the bonded surfaces.

The water-resistance of the modified starch adhesives was determined by bonding together two strips of fiber sheets by the method described above, allowing the bonded strips to remain at room temperature for 24 hours, immersing them and keeping them under 1" of water for 24 hours, weighing them, tearing them apart, examining them for delamination and estimating damage produced to the surfaces by tearing action. These tests consistently showed that the initial tack of the adhesive prepared from dextrins, mixtures of dextrin and thin boiling starches, and from thin boiling starches without dextrin, all of which contained aluminum sulfate as a modifying agent, was much better than that of the corresponding adhesives containing no aluminum sulfate.

Percentages of acid modified starch in the adhesive compositions were determined both by gravimetric method and by means of a Bausch & Lomb hand refractometer.

The viscosity of the acid modified starch adhesive depends not only on the temperature but on the concentration of solids and the pH value as well. I have found that the amount of acid converted starch in the adhesive should lie within the range of 35 to 45% and preferably near 40%. The exact selection of the solids concentration will depend on the type of acid converted starch employed. The adhesives prepared from dextrins usually give the lowest viscosity; the thin boiling starches give the highest viscosity, and the mixture of both produces an intermediate viscosity at the same solids concentration, temperature and pH values. Acid converted starches modified by the addition of aluminum sulfate and possessing a viscosity of 700 to 7,000 centipoises at 67° C. at a pH of 5, and at a solids contact of 40% were found to be suitable for application in the lamination of cellulose fiber sheets. Such starch adhesives with viscosities lower than 700 centipoises lack in initial tack and those with viscosities above 7,000 centipoises lack the required fluidity.

The use of a dispersing agent capable of undergoing hydrolysis during cooking of the adhesive is optional in the process of the preparation of acid converted starch adhesives modified by the addition of aluminum sulfate. The dispersion of such starches in water in the absence of a dispersing agent, however, usually requires a considerable length of time. Sodium sulfo-succinate esters are, therefore, useful for shortening the time required for dispersing the starch. The dextrins disperse with greater difficulty than mixtures of dextrins and thin boiling starches, and thin boiling starches alone disperse more readily in water than either of the above two products. As a consequence, the use of a hydrolyzable surface active agent in the preparation of an adhesive will usually be employed when dextrins are used alone. Their use will be optional when a mixture of dextrins and thin boiling starches are used, and ordinarily their use becomes unnecessary when thin boiling starches are employed alone. In general, it has been found that 0.01 to 0.2% of sodium sulfosuccinate dioctyl esters, known to the trade as Aerosol OT, or similar esters, based on the weight of the water in the adhesive, is sufficient to produce satisfactory wetting of the dextrin.

A further improvement in the properties of the adhesive has been obtained by the incorporation into the composition of an amount of sodium pentachlor-phenate ranging between 1 and 2% based on the weight of the dry acid converted starch. Sodium pentachlor-phenate in smaller quantities has been used in the past as an insecticide and bactericide in acid converted starch adhesives without much success. In accordance with earlier practice the inhibition to mold and other fungus growth was limited to the area occupied by the adhesive film. The good flowing characteristics of the adhesive of this invention, the use of elevated temperatures during the application of the acid converted starch adhesive modified by the addition of aluminum sulfate, and the increased quantity of sodium pentachlor-phenate which may be employed has extended the effectiveness of this material so that laminated fiber boards prepared in accordance with this invention are resistant to the attack of mold and termites throughout their entire structure.

The adhesive of the present invention may be prepared by first dissolving the wetting agent, if employed, in water and then charging the acid converted starch into the water or solution of wetting agent while the water or solution is at room temperature. In general, it is preferable to charge the starch in small portions while continuously stirring the mixture. Stirring is continued until all lumps of the acid converted starch are dispersed. The relative amounts of water or aqueous solution of wetting agent and acid converted starch are selected so as to produce a solids content in the resulting adhesive between approximately 35 and 45% by weight. After dispersal, the starch is cooked by heating the mixture to a temperature between 86° and 93° C., and holding it at this temperature for a period of time which usually ranges between 10 and 30 minutes, the preferred procedure being to cook the starch for 15 minutes at 93° C. The sodium pentachlor-phenate, if employed, is preferably added along with the starch, i. e., before cooking. The aluminum sulfate may be added either before or after cooking. In either case the resulting adhesive is usually cooled to a temperature between approximately 65° and 75° C. immediately after cooking and maintained at such temperature during application of the adhesive.

The adhesive thus prepared is particularly suitable for bonding sheets of cellulose fibers together to form a laminated fiber board such as a wall-board. Any known or suitable type of laminating apparatus may be employed. In employing the present adhesive, it is spread on the laminates while at a temperature between approximately 65° and 75° C., and the laminated board immediately subjected to pressure. Because of the high initial tack of the adhesive, it has been found that the speed of lamination may be increased 50 to 75% over laminating processes employing conventional starch adhesives. Also the resulting laminated board has greatly improved water-resistance.

*Example I*

7,900 parts of water by weight and 6.5 parts of di-2-ethyl hexyl sodium sulfo-succinate known as Aerosol OT, 25% solution, were charged into a closed steel kettle equipped with a mechanical stirrer, automatic heating and cooling coil, and a direct steam outlet. While stirring the water containing the dispersing agent at room temperature, 4,400 parts of dextrin known in the art as Dextrin No. 162, and 2,600 parts of dextrin known in the art as Dextrin No. 3502, were added in small portions. During addition of the dextrin, 75 parts of sodium pentachlor-phenate were also added. After stirring the charge for 1 hour all lumps of dextrin were dispersed. The pH of the mixture was 6.0. The stirring was continued while the mixture was heated to and held at 93° C. This temperature was maintained for 15 minutes. After completion of cooking and cooling to 67° C., 10 parts of aluminum sulfate was added with continued stirring and the temperature of the adhesive was maintained at 67° C. The adhesive thus prepared contained 41% solids; its pH was 4.9 and its viscosity was 1,700 centipoises at 67° C. The evaluation of the initial tack of the adhesive and the water-resistance of the bond obtained therefrom showed that they were greatly superior to those obtained from an adhesive prepared by an identical procedure and from the same materials, with the exception that the use of aluminum sulfate was omitted. The concentration of solids in the adhesive containing no aluminum sulfate was also 41%, while its pH was 5.5 and its viscosity was 1,800 centipoises. The maximum machine speed at which satisfactory bonding took place could be increased by 75% when the adhesive containing aluminum sulfate was employed. Marked improvement in water-resistance of the board laminated with the adhesive containing aluminum sulfate over that laminated with the adhesive containing no aluminum sulfate was obtained.

*Example II*

While stirring 8,000 parts of water by weight at room temperature, the following dextrins and thin boiling starch were added gradually to it:

2,400 parts of dextrin known as Dextrin No. 3502
1,200 parts of dextrin known as Dextrin No. 152
3,400 parts of thin boiling starch known as Eagle Starch No. 3218

After the addition of the dextrins and thin boiling starch was completed, 75 lbs. of sodium pentachlor-phenate was added and the mixture was stirred for 16 hours until all lumps were disintegrated. The mixture was cooked at 93° C. for 15 minutes and the temperature reduced to 67° C. The pH of the adhesive at the end of the cooking operation was 5.7 and after the addition of 10 parts of aluminum sulfate became 4.9. The adhesive contained 40% of solids, and its viscosity was 1,100 centipoises at 67° C. The adhesive possessed excellent flow characteristics, greatly improved initial tack, and its dry films were more water-resistant than those of the adhesive prepared by identical procedure and from the same materials, with the exception that the use of aluminum sulfate was omitted.

*Example III*

500 parts of thin boiling starch, known to the trade as Colloidate No. 5 and 6,500 parts of thin boiling starch, known to the trade as TW No. 2, were charged with stirring into 7,500 parts of water by weight at room temperature. After stirring the mixture for 2 hours all starch lumps disintegrated. The pH of the mixture was 7.1. After the addition of 75 parts of sodium pentachlor-phenate and 45 parts of aluminum sulfate the mixture was heated with direct steam to 93° C. and this temperature was maintained for 15 minutes. The adhesive was then cooled to 71° C. and this temperature was maintained during its application on the laminating machine. The adhesive contained 40% solids. Its pH was 4.9 and its viscosity was 6,000 centipoises at 67° C. The adhesive thus prepared was used on the laminating machine at its maximum speed. In order to be better able to control the thickness of the film deposited on the sheet, the adhesive was subsequently diluted with water to 38.5% solids content. The lamination with the diluted and less viscous adhesive could also be conducted at an equally high machine speed with satisfactory results. The resulting laminated board was well bonded and possessed improved water-resistance.

I claim:
1. An adhesive having water-resistant characteristics and high initial tack for bonding sheets of cellulose fiber together to produce a laminated product, said adhesive consisting essentially of a cooked aqueous dispersion of be- tween 35 and 45% by weight based on the total weight of the adhesive of acid-converted starch and between 0.1 and 0.3% by weight based on the weight of said starch of aluminum sulfate, the remainder of said adhesive being essentially water, said adhesive having a pH between 4.5 and 5.2 and a viscosity between 700 and 7000 centipoises at 67° C.

2. An adhesive as defined in claim 1 which also contains between 1 and 2% by weight based on the weight of said starch of sodium pentachlor-phenate.

3. The method of making an adhesive having water-resistant characteristics and high initial tack for bonding sheets of cellulose fibers together to produce a laminated product, which method comprises, dispersing acid-converted starch in water in an amount providing a starch content between 35 and 45% by weight based on the total weight of the resulting dispersion, cooking said dispersion at a temperature between 86 and 93° C. for a time between 10 and 30 minutes, incorporating into said dispersion a content of between 0.1 and 0.3% by weight based on the weight of said starch of aluminum sulfate, the resulting adhesive being adjusted to a pH between 4.5 and 5.2 and consisting essentially of said content of starch and said content of aluminum sulfate, the remainder being essentially water.

4. The method as defined in claim 3 in which said content of aluminum sulfate is incorporated into said dispersion prior to said cooking.

5. The method as defined in claim 3 in which said content of aluminum sulfate is incorporated into said dispersion subsequent to said cooking.

6. The method as defined in claim 3 in which 1 to 2% of sodium pentachlor-phenate by weight based on the weight of said starch is also incorporated into said dispersion.

7. The method of making an adhesive having water-resistant characteristics and high initial tack for bonding sheets of cellulose fibers together to produce a laminated product, which method comprises, dispersing acid-converted starch in water in an amount providing a starch content between 35 and 45% by weight based on the total weight of the resulting dispersion, cooking said dispersion at a temperature between 86 and 93° C. for a time between 10 and 30 minutes, incorporating into said dispersion a content of between 0.1 and 0.3% by weight based on the weight of said starch of aluminum sulfate, the resulting adhesive being adjusted to a pH between 4.5 and 5.2 and consisting essentially of said content of starch and said content of aluminum sulfate, the remainder being essentially water, said dispersion of said starch being carried out in the presence of a wetting agent which is decomposed during said cooking.

8. The method as defined in claim 7 in which the wetting agent is di-2-ethylhexyl sodium sulfo-succinate.

9. The method of making a water-resistant, laminated fiber board, which comprises, spreading on a surface of a sheet of said cellulose fiber a layer of an adhesive having water-resistant characteristics and high initial tack, while said adhesive is at a temperature between 65 and 75° C., said adhesive consisting essentially of a cooked aqueous dispersion of between 35 and 45% by weight based on the total weight of the adhesive of acid-converted starch and between 0.1 and 0.3% by weight based on the weight of said starch of aluminum sulfate, the remainder of said adhesive being essentially water, said adhesive having a pH between 4.5 and 5.2 and a viscosity between 700 and 7000 centipoises at 67° C., superimposing another sheet of cellulose fiber on the first-mentioned sheet in contact with said layer and promptly pressing said sheets together.

10. The method as defined in claim 9 in which said dispersion is cooked at a temperature between 86 and 93° C. for 10 to 30 minutes.

11. The method as defined in claim 9 in which said adhesive also contains between 1 and 2% of sodium pentachlor-phenate by weight based on the weight of said storage.

12. A laminated cellulose fiber board having improved water resistance, which comprises, sheets of cellulose fiber adhered together with an adhesive consisting essentially of a cooked aqueous dispersion of between 35 and 45% by weight based on the total weight of the adhesive of acid-converted starch and between 0.1 and 0.3% by weight based on the weight of said starch of aluminum sulfate, the remainder of said adhesive being essentially water, said adhesive having a pH between 4.5 and 5.2 and a viscosity between 700 and 7000 centipoises at 67° C.

13. The laminated cellulose fiber board as defined in claim 12 in which said adhesive also contains between 1 and 2% of sodium pentachlor-phenate by weight based on the weight of said starch to increase the resistance of said board to fungus growth.

WALTER P. ERICKS.

References Cited in the file of this patent

UNITED STATES PATENTS

| Number | Name | Date |
|---|---|---|
| 185,669 | Cashin | Dec. 26, 1876 |
| 203,038 | Hebdon | Apr. 30, 1878 |
| 1,378,128 | Perkins et al. | May 17, 1921 |
| 1,996,032 | Roos | Mar. 26, 1935 |
| 2,105,052 | Oltmans | Jan. 11, 1938 |
| 2,344,600 | Codwise | Mar. 21, 1944 |
| 2,373,016 | Daly et al. | Apr. 3, 1945 |
| 2,410,382 | Kaplan | Oct. 29, 1946 |
| 2,414,074 | Vitalis | Jan. 7, 1947 |
| 2,419,160 | Pierson | Apr. 15, 1947 |
| 2,427,562 | Kesler et al. | Sept. 16, 1947 |
| 2,544,279 | Page | Mar. 6, 1951 |
| 2,544,714 | Moore | Mar. 13, 1951 |
| 2,548,646 | Bicknell | Apr. 10, 1951 |
| 2,610,136 | Casey | Sept. 9, 1952 |